(12) United States Patent
Basu (10) Patent No.: US 10,318,262 B2
(45) Date of Patent: Jun. 11, 2019

(54) SMART HASHING TO REDUCE SERVER MEMORY USAGE IN A DISTRIBUTED SYSTEM

(71) Applicant: Microsoft Technology Licensing, LLC, Redmond, WA (US)

(72) Inventor: Abhinaba Basu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/946,565

(22) Filed: Nov. 19, 2015

(65) Prior Publication Data
US 2016/0283226 A1 Sep. 29, 2016

Related U.S. Application Data

(60) Provisional application No. 62/137,952, filed on Mar. 25, 2015.

(51) Int. Cl.
*G06F 8/53* (2018.01)
*G06F 8/61* (2018.01)

(52) U.S. Cl.
CPC . *G06F 8/53* (2013.01); *G06F 8/61* (2013.01)

(58) Field of Classification Search
CPC .................................... G06F 8/70; G06F 8/53
USPC ......................................................... 717/121
See application file for complete search history.

(56) References Cited

U.S. PATENT DOCUMENTS

| 7,020,677 | B1 | 3/2006 | Baillif et al. |
| 7,124,408 | B1 | 10/2006 | Parthasarathy et al. |
| 7,673,148 | B2 | 3/2010 | Zou et al. |
| 8,479,161 | B2 | 7/2013 | Weigert |

(Continued)

FOREIGN PATENT DOCUMENTS

CN 101414278 B 9/2010

OTHER PUBLICATIONS

Anthony Desnos, "Android : Static Analysis Using Similarity Distance", [Online], 2012, pp. 5394-5403, [Retrieved from internet on Jan. 30, 2019], <https://www.computer.org/csdl/proceedings/hicss/2012/4525/00/4525f394.pdf> (Year:2012).*

(Continued)

*Primary Examiner* — Ziaul A Chowdhury
*Assistant Examiner* — Zengpu Wei
(74) *Attorney, Agent, or Firm* — Jeffrey L. Ranck; Ranck IP Law (57) ABSTRACT

Architecture that computes smart-hashes (checksums) in a central server, and in a language agnostic way. The process comprises: decompiling the binaries using language/platform specific tool(s); applying configurable filtering of the decompiled output and only keeping contents that are semantically relevant; generating a hash (checksum) on those filtered semantically relevant content; and, downloading to each of the machines in the data-center a checksum list from a repository. When an assembly is requested to be loaded on a server, a check is made if another assembly with the same checksum has already been loaded on the server: if yes, the assemblies are semantically same, and hence, the download is not completed, and the assembly already present on the server is used.

19 Claims, 8 Drawing Sheets

(56) References Cited

U.S. PATENT DOCUMENTS

| | | | | |
|---|---|---|---|---|
| 8,799,236 | B1* | 8/2014 | Azari | G06F 17/30156 707/688 |
| 8,799,662 | B2 | 8/2014 | Muzammil et al. | |
| 2008/0209401 | A1* | 8/2008 | Fanning | G06F 11/3628 717/124 |
| 2008/0215968 | A1 | 9/2008 | Bekerman | |
| 2013/0097659 | A1 | 4/2013 | Das et al. | |
| 2013/0246370 | A1* | 9/2013 | Bartram | G06F 21/577 707/692 |
| 2013/0347094 | A1* | 12/2013 | Bettini | H04L 63/0245 726/11 |
| 2014/0223565 | A1* | 8/2014 | Cohen | G06F 21/562 726/23 |
| 2014/0245027 | A1* | 8/2014 | Lee | G06F 21/74 713/193 |
| 2014/0282471 | A1 | 9/2014 | Chaney et al. | |
| 2015/0088967 | A1* | 3/2015 | Muttik | G06F 21/55 709/203 |
| 2015/0244737 | A1* | 8/2015 | Siman | G06F 21/51 726/23 |
| 2016/0094564 | A1* | 3/2016 | Mohandas | G06F 21/563 726/24 |
| 2016/0191338 | A1* | 6/2016 | Sankaranarasimhan | G06F 3/04842 715/738 |
| 2016/0267270 | A1* | 9/2016 | Lee | H04L 63/145 |

OTHER PUBLICATIONS

Katja Hahn, "Robust Static Analysis of Portable Executable Malware", [Online], 2014, pp. 1-116, [Retrieved from internet on Jan. 30, 2019], <http://scholar.google.com/scholar_url?url=https%3A%2F%2Fraw.githubusercontent.com%2Fkatjahahn%2FPortEx%2Fmaster%2Fmasterthesis%2Fmasterthesis.pdf>.*

Mohannad Reza Farhadi, "Assembly Code Clone Detection for Malware Binaries", [Online], 2013, [Retrieved from internet on Jan. 30, 2019], <https://spectrum.library.concordia.ca/977131/1/Farhadi_MASc_S2013.pdf> (Year: 2013).*

Stucampbell, "Assembly Comparer", Published on: Mar. 15, 2012, Available at: https://github.com/stucampbell/AssemblyComparer.

"Introducing JetBrains dotPeek", Published on: Aug. 15, 2013, Available at: https://confluence.jetbrains.com/display/NETCOM/Introducing+JetBrains+dotPeek.

"Welcome to DJ Java Decompiler Homepage", Pulished on: Jun. 29, 2014, Available at: http://www.neshkov.com/dj.html.

Heckel, Philipp C., "Hacking Flash Applications and Games: A Case Study", Published on: Mar. 1, 2011 Available at: http://blog.philippheckel.com/2011/03/01/hacking-flash-games-a-case-study/#Capture-the-client-server-communication.

* cited by examiner

SMART HASHING TO REDUCE SERVER MEMORY USAGE IN A DISTRIBUTED SYSTEM

CROSS-REFERENCE TO RELATED APPLICATIONS

This application claims the benefit of U.S. Provisional Patent Application Ser. No. 62/137,952 entitled "SMART HASHING TO REDUCE SERVER MEMORY USAGE IN A DISTRIBUTED SYSTEM" and filed Mar. 25, 2015, the entirety of which is incorporated by reference herein.

BACKGROUND

Software vendors recognize the benefits of enabling third-party developers the capability to develop and have distributed third-party software (e.g., plugins) to numerous connected consumers. An application server can be a general purpose server on which the vendors can develop and deploy plugins, and deployed as a middle tier of a search stack that serves billions of search queries. Each plugin can be developed as a binary package (assembly) in a way to provide metadata, which metadata can be read by the application server to configure and load the plugins, and then run the plugins.

However, a significant problem with this approach is that vendors typically build from the same sources and create binaries which differ without any real semantic difference. Thus, it can be the case that thousands of copies of substantially redundant binaries are loaded, albeit in a different package. Moreover, these thousands of assemblies, many of which are redundant, can be loaded on tens of thousands of machines in a data center, which results in an enormous waste in computing resources such as at least memory.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a way of computing smart-hashes (and also checksums, or other techniques that can be employed to generate a value for a set of input data) in a central server, for example, and in a language agnostic way (the language used to create the binaries (non-text files) in assemblies of code, where an assembly is a runtime unit of types and resources of a same version). The process comprises: decompiling the binaries (also referred to as code assemblies) using language/platform specific tool(s) to expose content that corresponds to (is part of) each of the binaries; applying configurable filtering to the content (in the decompiled output) of the binaries and only keeping the binaries having content that is deemed to be semantically relevant; generating a value from the content (e.g., a checksum (or hash)) for each instance of the semantically relevant content; and, downloading from a repository to each of the machines (e.g., in the data-center) a checksum list of the binaries already existing on (or being pushed to) the machines.

Thus, when a subsequent binary (assembly) is requested to be downloaded to a machine such as a server, the appropriate decompiling tool is selected for that subsequent binary, the subsequent binary is decompiled to expose its content, a checksum is derived for the content, and the newly-derived checksum is compared (matched) against all other checksums (or hashes, or a hash table where hashes are used) on the checksum list for the specific machine. If a checksum match occurs, this indicates the binary (assembly) is semantically the same as the binary already on the machine, and hence, the download is not necessary. Thus, the binary (assembly) already present on the server is used. If no match occurs in the content checksums of the list, this indicates the binary is not on the machine and the binary (assembly) can then be downloaded to the machine and used. The checksum list will then be updated to include the latest content checksum for the downloaded binary for that specific machine.

The comparison can be made against a copy of the checksum list stored in the repository for that specific machine or directly against the checksum list stored on the machine or some other location (e.g., a replica on another target machine). The list for any given machine can comprise a table having at least a first column of content checksums and another column of binaries related to each of the checksums. a check is made ato the checksum list of the targeted machine to see As used herein, the terms "hash", "hashing", and "checksums" are techniques that can be employed to generate a value that uniquely identifies a block of input data, which input data can be the content associated with a decompiled assembly (binary). Hashing employs a hash function that maps input data of an arbitrary size into output data of a fixed size where the fixed-size data is referred to as the "hash" of the input. A checksum algorithm also outputs a value for a given set of input data, where the output value is referred to as the checksum of the input. Although described in the context of checksums, it is intended to be understood that hashes can be employed instead of checksums.

The disclosed architecture can comprise a system that includes a filter component configured to filter decompiled output (i.e., content) of a code assembly (also referred to herein as a binary package or binaries) to obtain semantically relevant content, a matching component configured to generate a checksum for the semantically relevant content, a download component configured to refrain from download of the semantically relevant content to a server when the checksum is on a checksum list stored on the server.

Semantic relevancy can be based on the configurable filtering. Requirement/conditions can be set that define semantic relevancy for binaries (or assemblies). Consider the following three examples, where the relevancy requirements are of increasing strictness. In a first example, consider two DLL (dynamic link library) assemblies; a.dll and a'.dll. For these to be considered the "same" or semantically equivalent, the only requirement is that they contain the same externally (publicly visible) functions (e.g., as in API-compatible). In a second example, the requirement to be semantically relevance is that both a and a' contain the exact same functions and members, either public or private. This can mean that a and a' are "very similar", but the exact implementation details are not needed for this equivalency metric. In a third example, a strict match requirement can be that a and a' should also have the "same" decompiled content. That is, even the implementations of a and a' exactly match. So based on the strictness of the requirements, the filters can be selected to meet the varying degrees in "equivalency" for semantic relevancy in the matching process.

The disclosed architecture can comprise a method, comprising acts of: decompiling binary packages of a central repository into decompiled binary packages of content, the binary packages in at least one of same languages or different languages; filtering the content of the decompiled binary packages to obtain semantically relevant content; generating a list of checksums or hashes for the semantically relevant content of the decompiled binary packages; storing the list on distributed system of target servers; and preventing download of a given binary package to a given target server when a checksum or a hash of the given binary package is on the list stored on the given target server.

The disclosed architecture can comprise an alternative method, comprising acts of receiving binary packages in a repository server, the binary packages in at least one of different formats or different languages; decompiling the binary packages into decompiled binary packages of content; filtering output of the decompiled binary packages to obtain semantically relevant content; generating a checksum for the semantically relevant content of each of the decompiled binary packages; storing the checksums in a plurality of servers; and, refraining from download of a given decompiled binary package to a target server when a checksum for the given decompiled binary package is on the target server.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

An application host server can be a general purpose server on which vendors can develop and deploy plugins. This infrastructure can be a middle tier of a search stack that serves billions of search queries daily. Each plugin can be developed as a binary package (assembly) and with XML (extensive markup language), which provides metadata. The application server reads the metadata to configure the plugins, loads the plugins, and then runs the plugins.

A workflow language can also be provided that selects plugins to combine and form a complex workflow. The workflow is created by combining specific versions of the plugins.

One problem with this approach is that vendors build from the same sources and create binaries which differ without any real semantic difference, and vendors package third-party software (e.g., an open source library) and ship the software in their own packages. What this means for the system is that thousands of copies of assemblies (binaries) are loaded, and which may essentially be redundant because the assemblies may contain the same functionality, albeit, in a different package. Moreover, each of these thousands of assemblies, many of which are redundant, are loaded on tens of thousands of machines in a data center, which leads to an enormous waste in resources.

A result of this unnecessary redundancy is that each server needs that much more memory than each server would otherwise need; additional computation is required to load the excessive amount of additional code; and, there are delays in application startup that can lead to an inordinate amount of time (e.g., thousands of minutes) of computation time being lost.

In one existing implementation, the binaries can be managed (e.g., using .NET™ by Microsoft Corporation), and the binaries can each be just-in-time (JIT) compiled on each of the thousands of machines. This specific problem can be solved on other platforms by using various versioning techniques (e.g., a .NET strong name). However, this solution only helps in the case where the exact same (bit-by-bit the same) assembly is loaded from a different path.

The disclosed architecture is a way of computing smart-hashes (and checksums) in a central server, and in a language agnostic way (the language used to create the binaries in assemblies of code, where an assembly is a runtime unit of types and resources of a same version). In one example, the process comprises: decompiling the binaries using language/platform specific tool(s); applying configurable filtering of the decompiled output and only keeping contents that are semantically relevant; generating a hash (checksum) on those filtered semantically relevant content; and, downloading to each of the machines in the data-center a checksum list from a repository. When an assembly is requested to be loaded on a server, a check is made to see if another assembly with the same checksum has already been loaded on the server: the assemblies are semantically the same, and hence, the download is not initiated and the assembly already present on the server is used.

In one implementation, the disclosed architecture significantly improves server usage by eliminating over half of the assemblies that would otherwise have been downloaded to each server.

The architecture employs a decompile and filter approach, where decompiled assemblies can be filtered to remove the following: assemblies that are exactly the same; assemblies that are re-built out of the same source (such assemblies vary because of things like a compiler-generated MVID (module version identifier (ID), a kind of globally unique ID); and, assemblies built-out with compilers such as VC++ generate types for some code patterns using random names (a specific filter is utilized to identify remove these).

A filter can be tuned such that method bodies can be ignored; thus, two assemblies can be deemed to be equivalent, if the hash of their public signatures matches.

The architecture operates in a language-agnostic way (e.g., implemented for .NET languages) because the hashing (or checksumming) is performed on decompiling of the assemblies (e.g., to a standard Microsoft Intermediate language (MSIL), which does not care if the original source for the assemblies was C#, VB.NET, or C++ (managed), for example.

In one implementation, vendor assemblies are uploaded to a central component (assembly) repository. A service runs on the assemblies, incrementally, and for all unprocessed components, performs the following: finds the platform-specific decompiling tool (e.g., Ildasm, an MSIL disassembler for .NET); decompiles the assembly (e.g., to MSIL); applies a configurable list of filters (e.g., to strip out a GUID, strip out names of types automatically generated by compiler, etc.); and computes the checksum on the filtered content.

After the filtering is complete, each server machine downloads the combined package of assemblies and associated assembly hashes.

When a process is required to load an assembly A, the process looks up the assembly hash, and determines if another assembly A' with same hash is already loaded (or not loaded); if yes, the process uses assembly A' rather than assembly A, resulting in resource savings, since only of assembly A and assembly A' is needed.

More specifically, with respect to filtering, filters can be provided that: remove GUIDs inserted by compilers; remove relative or absolute memory addresses generated by compilers; identify and filter names of automatically generated variables (e.g., for switch cases, function closures); filter specifically to consider types and methods implemented by a binary, but not consider the contents or implementations of those code; and, filter to consider only public accessible types and methods, and ignore all private implementation details (e.g., including other private/internal methods, types, etc.).

As a general comment, the use of filtering and the extent of filtering for a given filter is customizable, essentially as a compromise of performance and accuracy.

The disclosed architecture implements technical effects that provide significant savings when eliminating file redundancies in at least distributed computing systems. For example, servers can realize a reduction in memory, reduced computation loads, and reduced startup delays in application startups.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
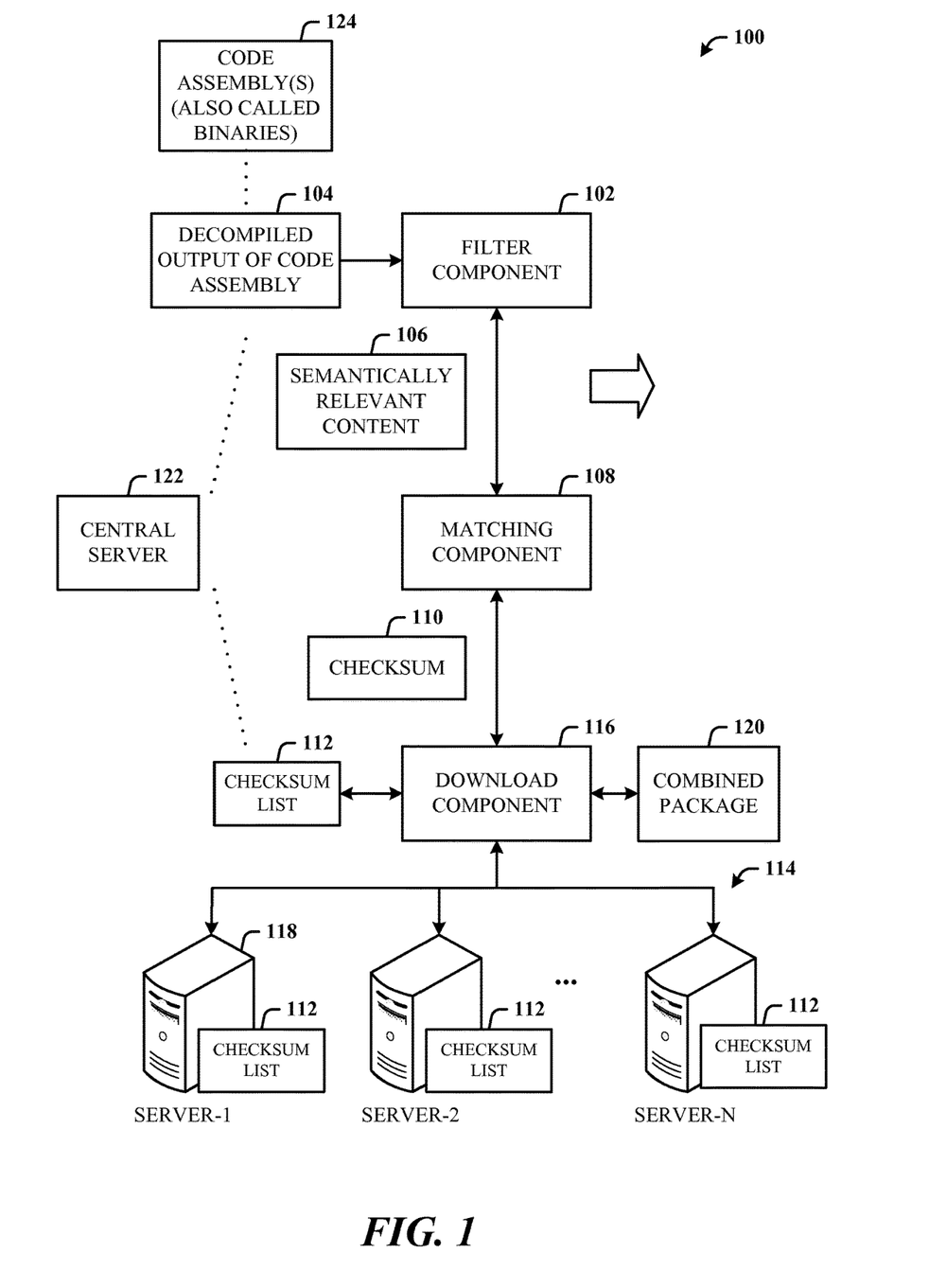
FIG. 1 illustrates a system in accordance with the disclosed architecture.

FIG. 1 illustrates a system 100 in accordance with the disclosed architecture. The system 100 can include a filter component 102 configured to filter decompiled output of a code assembly 104 (of code assembly(ies) 124) to obtain semantically relevant content 106. The filter component 102 can be selected from a set of different filters and that can be specific to the given code assembly. The filter component 102 can be configured to filter content of the decompiled output of the given code assembly to facilitate the determination of equivalency to other code assemblies based on the identification of semantically relevant content relative to the content of the other code assemblies. The "equivalency" between two binaries (code assemblies" can vary based on the strictness requirements imposed in the filtering process.

A matching component 108 is provided and configured to generate a value from the semantically relevant content 106 of the code assembly, where the value can be a checksum 110 or a hash of the semantically relevant content 106. Values such as checksums or hashes from various assembly packages are stored on a checksum (or value) list 112, which is loaded onto each of multiple recipient servers 114.

A download component 116 is provided and configured to refrain (prohibit) from download of the code assembly to a server 118 (of the multiple recipient servers 114), for example, when the checksum (value) 110 is on the checksum (value) list 112 (e.g., stored on the server 118, and/or at another location).

The matching component 108 can be configured to create a combined package 120 of files of the semantically relevant content 106 and the checksum list 112 of corresponding checksums of the files. The combined package 120 can then be stored with the download component 116 to facilitate download management (download or prevent/refrain from download) of the combined package 120 to the servers 114. The matching component 108 can be configured to download or facilitate download (via the download component 116) of the checksum list 112 of the files to the server 118 and other servers (of the servers 114) of a distributed computing system.

The filter component 102, matching component 108, and download component 116 can be hosted on a central server 122, and enable the generation of the checksums for the code assemblies of at least one of same or different source languages.

The filter component 102 can be configured to be tunable so that two or more code assemblies 124 are determined to be equivalent when the corresponding checksums of associated public signatures match. The filter component 102 can be configured to filter at least one of code assemblies that are the same, code assemblies generated from a same source, code assemblies that use names as automatically generated variables, memory addresses generated by compilers, types and methods implemented by a given code assembly without considering the content or implementations of that given code assembly, or only publicly-accessible types and methods while ignoring private implementation details.

The system can further comprise at least one hardware processor configured to execute computer-executable instructions in a memory, the instructions executed to enable the filter component, the matching component, and the download component.

Figure 2:
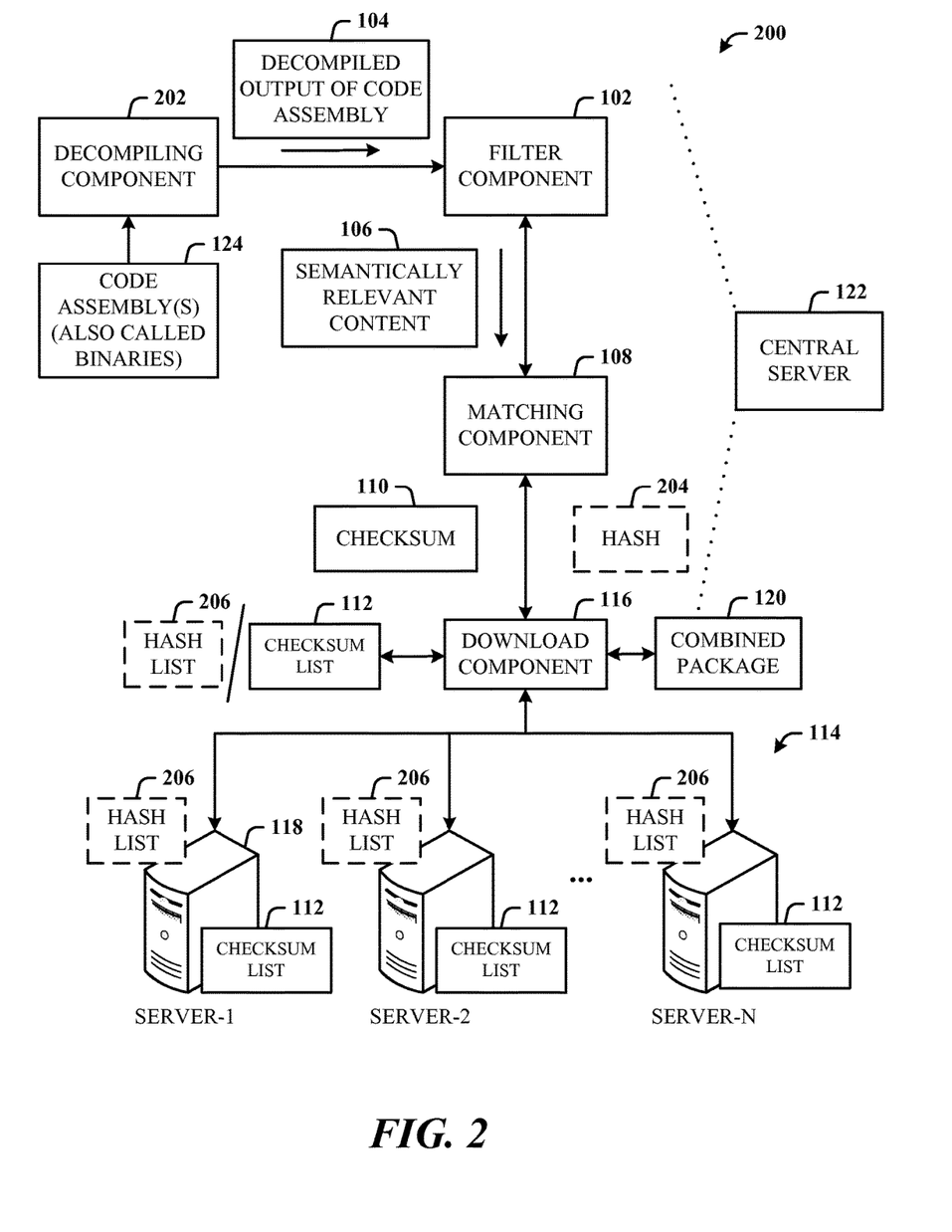
FIG. 2 illustrates an alternative system in accordance with the disclosed architecture.

FIG. 2 illustrates an alternative system 200 in accordance with the disclosed architecture. The system 200 comprises some or all of the items/components of system 100, but additionally, a decompiling component 202. The system 200 includes the filter component 102 configured to filter decompiled output of the code assembly 104 to obtain the semantically relevant content 106. The matching component 108 is provided and configured to generate the checksum 110 for (from) the semantically relevant content 106. Checksums from various assembly packages are stored on the checksum list 112, which is loaded onto each of multiple recipient servers 114 (e.g., of a datacenter, or more generally, a distributed system of computing systems such as servers, such as the server 118 of the servers 114).

The download component 116 is provided and configured to manage downloads, such as to refrain (prohibit) from download of the semantically relevant content 106 to a server 118 (of the multiple recipient servers 114), for example, when the checksum 110 is on the checksum list stored on the server 118.

Although depicted in system 100 and 200 as computing the checksum 110 of the semantically relevant content 106, and including the checksum 110 in the checksum list 112 downloaded to the servers 114, alternatively or in combination therewith, it is to be understood that a hash 204 of the semantically relevant content 106 can be generated and included in a hash list (or table) 206 downloaded to the servers 114.

The decompiling component 202 can be configured to select a specific decompiling tool for a given code assembly to generate the language agnostic decompiled code assemblies. This selection capability can be achieved by analyzing source information (e.g., metadata) of the source language used to create the code assembly, and then choosing the tool suitable for decompiling that specific code assembly.

The decompiling component 202, filter component 102, matching component 108, and download component 116 can be hosted on the central server 122, and enable the generation of the checksums for the code assemblies of at least one of same or different source languages.

Figure 3:
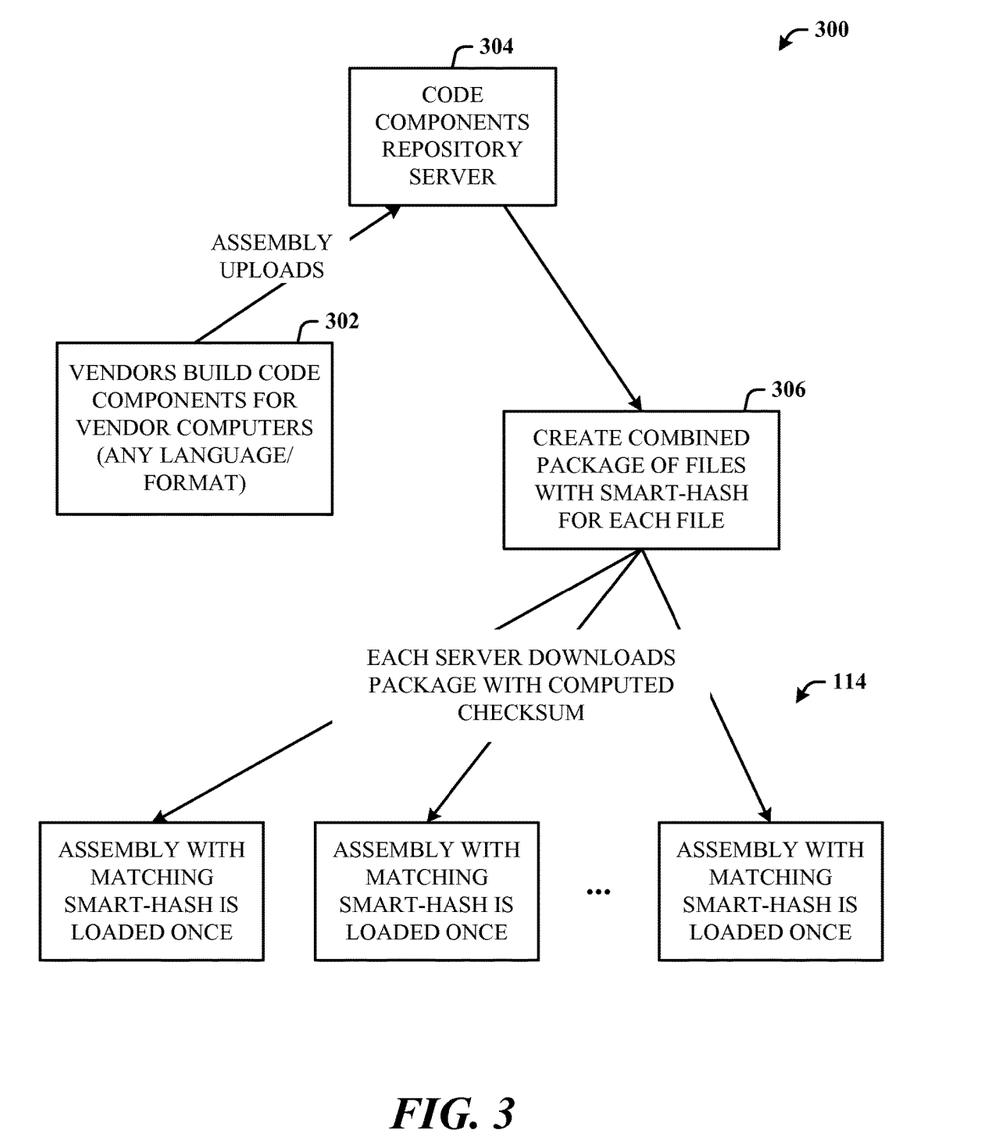
FIG. 3 illustrates a mixed system and flow diagram in accordance with the disclosed architecture.

FIG. 3 illustrates a mixed system and flow diagram 300 in accordance with the disclosed architecture. The flow portion of the diagram 300 begins at 302 with vendors building code components (assemblies or binaries) using any of a variety of possible tools that vendors can use to make such code components. The vendors then upload the code components to an assembly repository server 304 (similar to the central server 122).

The repository server 304 can also comprise a variety of decompiling tools to handle the disassembly of many assemblies created by assembly-creation tools used by the vendors, as well as other capabilities, such as filtering, checksum/hash generation, download management, etc. Thus, the repository server 304 can decompile the assemblies (also referred to as "binaries") into decompiled output using language- and platform-specific tool(s). The repository server 304 can then apply filtering (e.g., configurable) to the decompiled output to keep (retain) only content that is semantically relevant. The repository server 304 can then generate a smart-hash (or checksum) on the filtered semantically relevant content, and encapsulate these as a combined package of the semantically relevant content files and the checksum(s) (or hashes), as indicated at 306.

The repository server 304 then downloads a list of checksums (or hashes and/or hash table) and associated packages (separately, or as the combined package 120) to each of the servers 114 (e.g., in the datacenter). Thereafter, when an assembly is requested to be loaded (e.g., into memory) on a server (e.g., server 118), a check is made, using the assembly checksum to determine if an assembly with the same checksum (on the checksum list 112) already exists on the server (e.g., server 118). When the checksum, of the assembly that would be downloaded, is found on the checksum list 112, it is known that the assembly to be downloaded and the assembly already on the server 118 are semantically the same; hence, the download is not initiated and the assembly already present on the server 118 is used (already in server memory or on the server for loading into the server memory).

It should be understood that in one implementation, a single assembly and associated checksum, encapsulated as a package, can be transmitted to the recipient server or servers, and then the checksum list currently resident on the recipient server(s) is updated at the recipient server(s) using the transmitted checksum, rather than sending an entirely updated checksum list from the repository server 304 to each server on which the assemblies reside. Alternatively, the single assembly and associated checksum package along with an updated checksum list can be transmitted to the desired recipient server(s), where the updated checksum list automatically replaces the prior checksum list to match the existing assemblies stored on the recipient server(s).

However, where all servers are to be hosting the same assemblies, it becomes advantageous to ensure that all servers are alike insofar as the checksum list and hosted assemblies. In this implementation, the servers can synchronize assemblies and associated assembly checksums via the repository server 304, or via each other should the repository server 304 be offline.

The assembly packages can be pushed to the recipient servers from the repository server 304, and/or the recipient servers can pull the assembly packages from the repository server 304, as needed. The pull or "on-demand" method can also reduce network traffic since the desired assembly is downloaded only when needed.

Thus, the disclosed architecture only downloads the assembly package (e.g., one or more assemblies and corresponding checksums) for a given package, once—assembly redundancy that exists in conventional systems, is eliminated.

Accordingly, referring back to FIG. 2, for the servers 114, only one assembly package instance is downloaded to each of the desired recipient servers 114.

Figure 4:
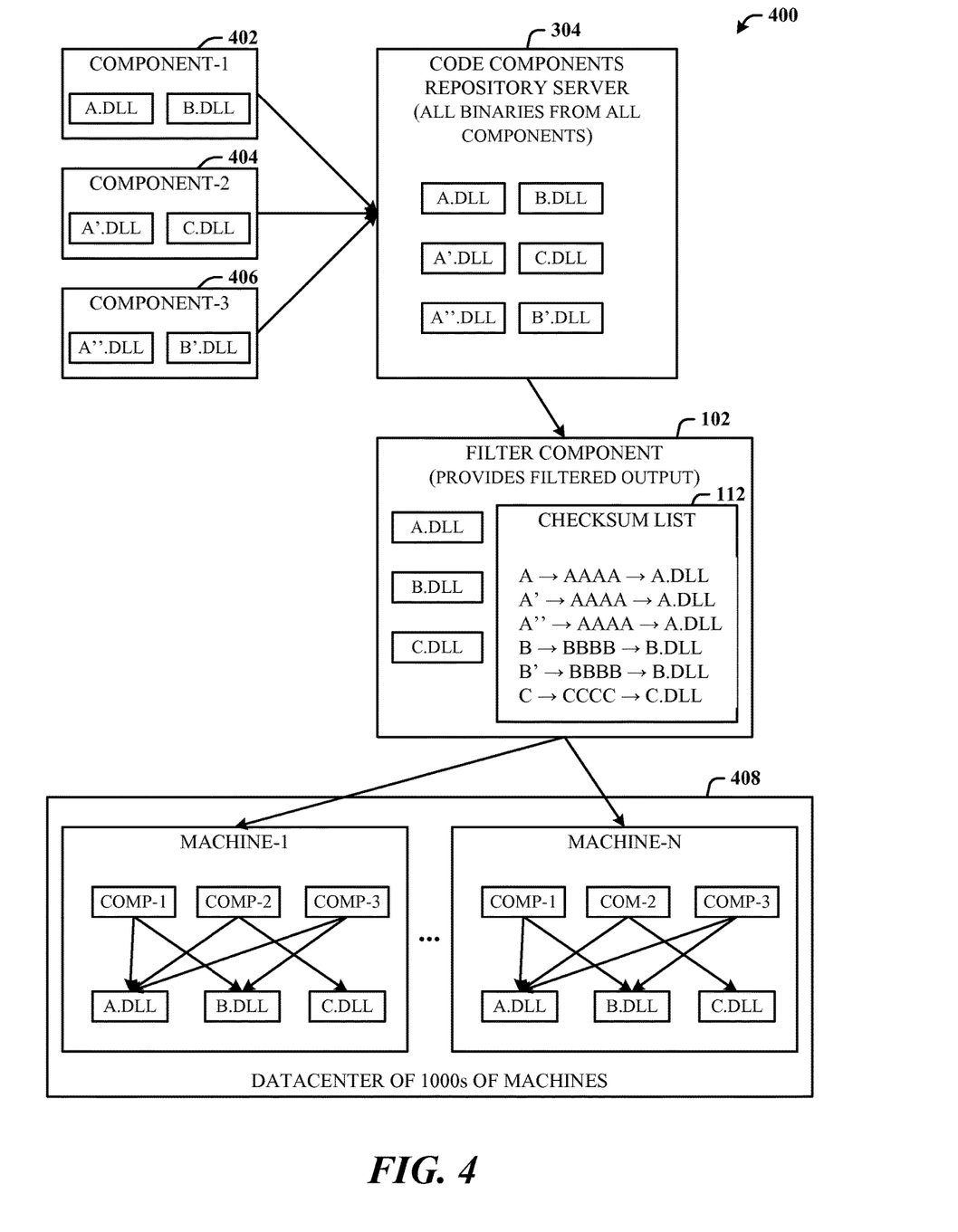
FIG. 4 illustrates a more detailed system of smart hashing in accordance with the disclosed architecture.

FIG. 4 illustrates a more detailed system 400 of smart hashing in accordance with the disclosed architecture. In this system 400, three components: a first component (COMPONENT-1) 402, a second component (COMPONENT-2) 404, and a third component (COMPONENT-3) 406 are to be used by vendors in a datacenter 408. These same components (402, 404, and 406) are depicted as Comp-1, Comp-2, and Comp-3 in the datacenter 408. Additionally, binaries (code assemblies or code components) for these components are created by one or more vendors and uploaded to the component repository 304 with the respective components (402, 404, and 406).

The first component 402 comprises two binaries—A.dll and B.dll; the second component 404 comprises two binaries—A'.dll and C.dll; and the third component 406 comprises two binaries—A".dll and B'.dll. Note that although indicated as dynamic link libraries (dll) files, it is to be understood that these are only examples, and that other binary types can be employed. The code component repository server 304 stores all six binaries (assemblies) of all vendor components. It can be the case that the components are not uploaded, but already provided on the vendor datacenter machines, and in this case, only the binaries are uploaded to the repository 304; however, both the components and the associated binaries can be uploaded.

The filter component 102 provides the filtered output of semantically relevant content. Here, after the filtering process, three of the six binaries uploaded from the same or different vendors are deemed to be redundant, and the checksum list 112 indicates which binaries are alike, and hence, will not be redundantly downloaded to the recipient servers. The filter component 102 identifies that A, A', and A" are equal and, B and B' are equal, as these respective sets of assemblies have the same checksums (i.e., A, A', and A" have the identical checksums and, B and B' have the same checksum).

For the six binaries in the repository 304, the checksum list 112 identifies the redundant files, thereby serving as the mapping that facilitates the removal of redundant downloads to the recipient (or target) server. Here, the checksum list 112 maps A, A', and A" all to the single A.dll binary (since A, A', and A" are redundant), maps B and B' to the single B.dll binary (since B and B' are redundant), and maps C to the C.dll binary, since it is not redundant.

What is then downloaded to one or more machines (Machine-1, . . . , Machine-N) of the datacenter 408, is the package of the three binaries (A.dll, B.dll, and C.dll) and the checksum list 112, and possibly, one or more of the components (402, 404, and 406). Referring to Machine-1, although the components (402, 404, and 406) as originally input to the repository 304, included different respective binaries, the mapping provided by the checksum list 112 eliminates the redundant download to the machines of all six of the binaries, when only three were needed.

For example, Comp-1 (the same as the first component 402) hosted on Machine-1 in the datacenter 408, utilizes the binaries A.dll and B.dll, as originally uploaded to the repository 304 and ultimately downloaded to Machine-1. However, Comp-2 (the same as the second component 404) hosted on Machine-1 in the datacenter 408, was originally associated with the binaries A'.dll and C.dll, which were uploaded to the repository 304, but now utilizes binary A.dll (and C.dll), since binary A'.dll was computed to be redundant to the already downloaded binary A.dll. Similarly, Comp-3 (the same as the third component 406) hosted on Machine-1 in the datacenter 408, utilizes the binaries A".dll and B'.dll, as originally uploaded to the repository 304; however, both A".dll and B'.dll were computed to be redundant to binaries A.dll and B.dll.

The filtering component 102 filters out at least redundancy and outputs the package (group) of three semantically similar and relevant (decompiled) binaries A.dll, B.dll, and C.dll and the checksum list 112, which list 112 indicates to Machine-1 that Comp-1 utilizes the binaries A.dll and B.dll, Comp-2 utilizes the binaries A.dll and C.dll (without downloading the originally uploaded binary A'.dll, since it is redundant to binary A.dll), and Comp-3 utilizes the binaries A.dll and B.dll, since the originally uploaded binaries A".dll and B'.dll are computed to be redundant to A.dll and B.dll.

It is to be understood that in the disclosed architecture, certain components may be rearranged, combined, omitted, and additional components may be included. Additionally, in some implementations, all or some of the components are present on the client, while in other implementations some components may reside on a server or are provided by a local or remote service. For example, some of all the filter component 102, matching component 108, download component 116, and decompiling component 202 can be located on the repository server 304. Alternatively, the repository server 304, and some or all of the components (102, 108, 116, and 202) can be located in the datacenter 408.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
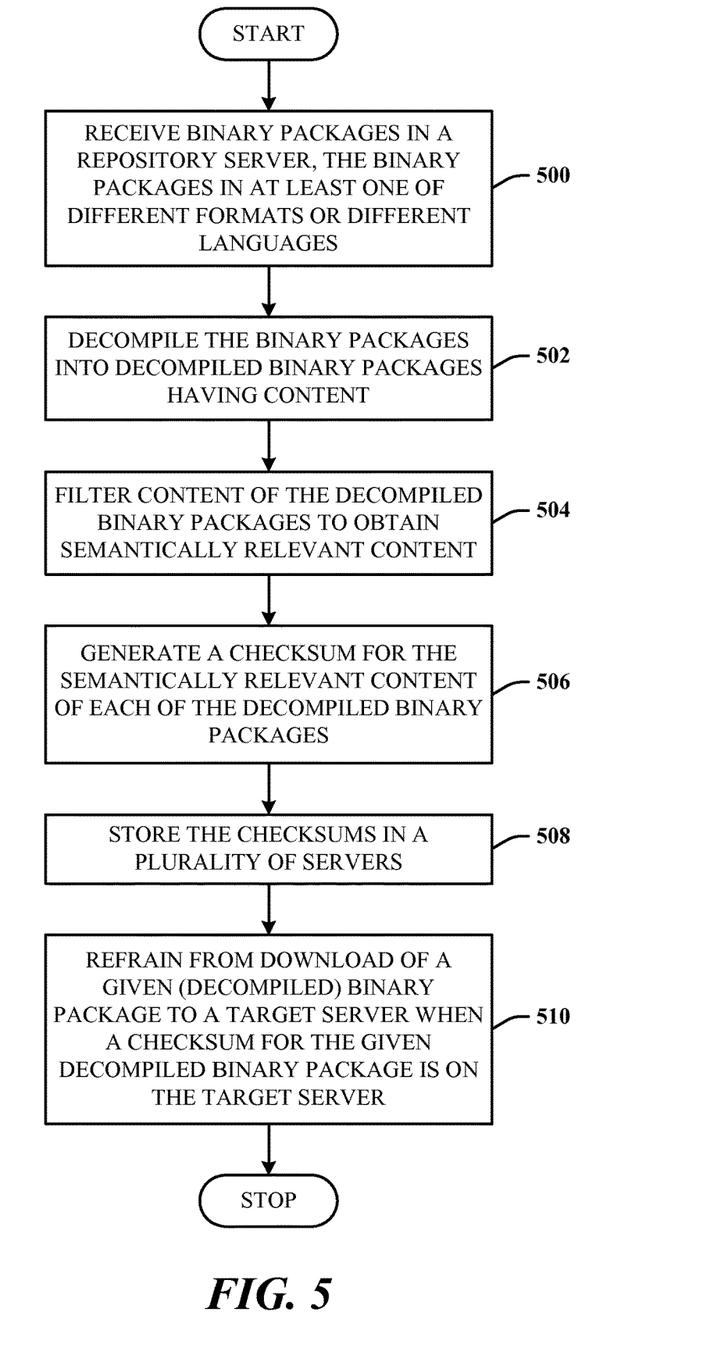
FIG. 5 illustrates a method in accordance with the disclosed architecture.

FIG. 5 illustrates a method in accordance with the disclosed architecture. At 500, binary packages are received in a repository server, the binary packages in at least one of different formats or different languages. At 502, the binary packages are decompiled into decompiled binary packages having content. At 504, the content (output) of the decompiled binary packages is filtered to obtain semantically relevant content. At 506, a checksum is generated for the semantically relevant content of each of the decompiled binary packages. At 508, the checksums are stored (e.g., as a checksum list) in a plurality of servers. At 510, a given (decompiled) binary package is refrained from download to a target server when a checksum for the given decompiled binary package is on the target server.

Figure 6:
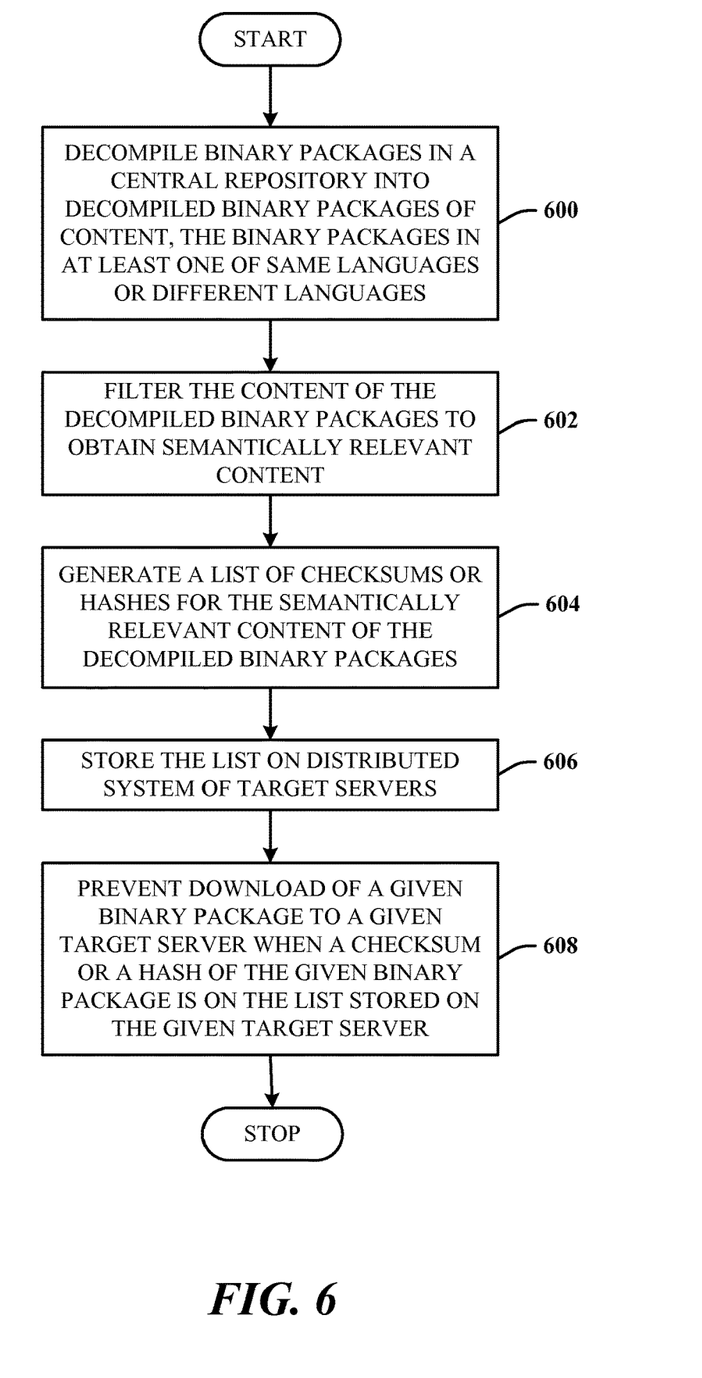
FIG. 6 illustrates an alternative method in accordance with the disclosed architecture.

FIG. 6 illustrates an alternative method in accordance with the disclosed architecture. At 600, binary packages of a central repository are decompiled into decompiled binary packages of content. The binary packages can be in at least one of same languages or different languages. At 602, the content of the decompiled binary packages is filtered to obtain semantically relevant content. At 604, a list of checksums or hashes is generated for the semantically relevant content of the decompiled binary packages. At 606, the list is stored on a distributed system of target servers (e.g., the servers 114). At 608, download of a given binary package to a given target server is prevent when a checksum or a hash of the given binary package is on the list stored on the given target server.

The method can further comprise, on the central repository, selecting a specific decompiling tool for a given binary package to generate the associated decompiled binary package, the decompiling tool based on the source language of the binary package. The method can further comprise performing the acts of decompiling, filtering, generating, and storing via the central repository.

The method can further comprise applying a configurable set of filters for the act of filtering the content. The method can further comprise loading into memory the given binary package only when the checksum or hash for the given binary package is not loaded into another target server.

The method can further comprise tuning the filtering so that two or more binary packages are determined to be equivalent when the corresponding checksums or hashes of associated public signatures match. The method can further comprise filtering at least one of: binary packages that are the same; binary packages generated from a same source; binary packages that use names as automatically generated variables; memory addresses generated by compilers; types and methods implemented by a given binary package without considering the content or implementations of that given binary package; or, only publicly-accessible types and methods while ignoring private implementation details.

Figure 7:
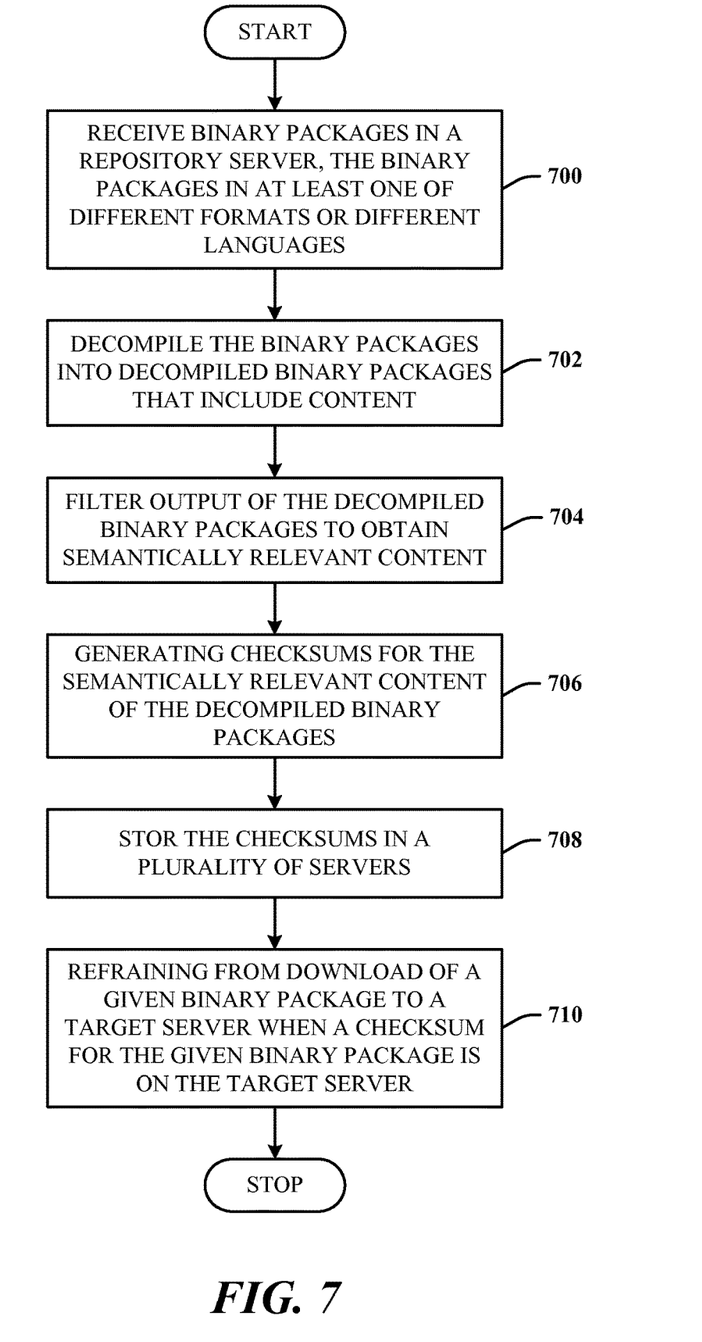
FIG. 7 illustrates yet another alternative method in accordance with the disclosed architecture.

FIG. 7 illustrates yet another alternative method in accordance with the disclosed architecture. At 700, binary packages are received in a repository server, the binary packages in at least one of different formats or different languages. At 702, the binary packages into decompiled binary packages that include content. At 704, the content output of the decompiled binary packages is filtered to obtain semantically relevant content. At 706, checksums are generated for the semantically relevant content of the decompiled binary packages. At 708, the checksums are stored in a plurality of servers. At 710, a given binary package is refrained from being downloaded to a target server when a checksum for the given binary package is on the target server.

The method can further comprise decompiling the binary packages of same or different source languages into decompiled outputs that include the semantically relevant content. The method can further comprise selecting a specific decompiling tool for a given binary package based on the source language of the binary package to generate the associated decompiled binary package.

The method can further comprise, after loading a binary package having a given checksum into a target server, checking a checksum list of the checksums on the target server to determine whether to download an equivalent binary package to the target server. The method can further comprise tuning the filtering so that two or more binary packages are determined to be equivalent when the corresponding checksums of associated public signatures match.

As used in this application, the term "component" is intended to refer to a computer-related entity, either hardware, a combination of software and tangible hardware, software, or software in execution. For example, a component can be, but is not limited to, tangible components such as one or more microprocessors, chip memory, mass storage devices (e.g., optical drives, solid state drives, magnetic storage media drives, etc.), computers, and portable computing and computing-capable devices (e.g., cell phones, tablets, smart phones, etc.). Software components include processes running on a microprocessor, an object (a software entity that maintains state in variables and behavior using methods), an executable, a data structure (stored in a volatile or a non-volatile storage medium), a module (a part of a program), a thread of execution (the smallest sequence of instructions that can be managed independently), and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
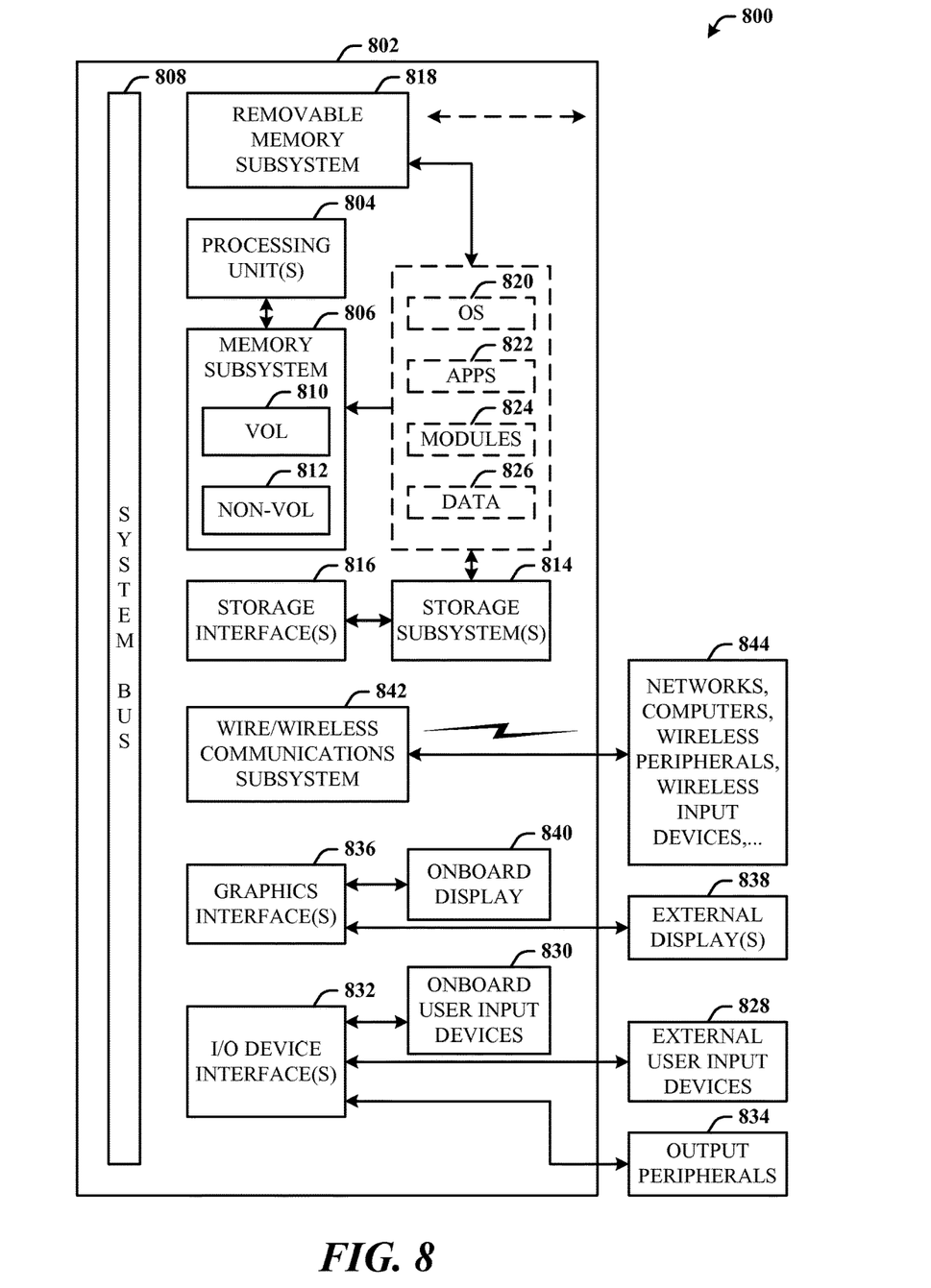
FIG. 8 illustrates a block diagram of a computing system that executes smart-hashing in accordance with the disclosed architecture.

Referring now to FIG. 8, there is illustrated a block diagram of a computing system 800 that executes smart hashing in accordance with the disclosed architecture. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc., where analog, digital, and/or mixed signals and other functionality can be implemented in a substrate.

In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 800 for implementing various aspects includes the computer 802 having microprocessing unit(s) 804 (also referred to as microprocessor(s) and processor(s)), a computer-readable storage medium (where the medium is any physical device or material on which data can be electronically and/or optically stored and retrieved) such as a system memory 806 (computer readable storage medium/media also include magnetic disks, optical disks, solid state drives, external memory systems, and flash memory drives), and a system bus 808. The microprocessing unit(s) 804 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 802 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 806 can include computer-readable storage (physical storage) medium such as a volatile (VOL) memory 810 (e.g., random access memory (RAM)) and a non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the microprocessing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components and circuits. The storage subsystem(s) 814 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The operating system 820, one or more application programs 822, other program modules 824, and/or program data 826 can include items and components of the system 100 of FIG. 1, items and components of the system 200 of FIG. 2, items and components of the diagram 300 of FIG. 3, items and components of the system 400 of FIG. 4, and the methods represented by the flowcharts of FIGS. 5-7, for example.

Generally, programs include routines, methods, data structures, other software components, etc., that perform particular tasks, functions, or implement particular abstract data types. All or portions of the operating system 820, applications 822, modules 824, and/or data 826 can also be cached in memory such as the volatile memory 810 and/or non-volatile memory, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 802, and include volatile and non-volatile internal and/or external media that is removable and/or non-removable. For the computer 802, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 802, programs, and data using external user input devices 828 such as a keyboard and a mouse, as well as by voice commands facilitated by speech recognition. Other external user input devices 828 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 802, programs, and data using onboard user input devices 830 such a touchpad, microphone, keyboard, etc., where the computer 802 is a portable computer, for example.

These and other input devices are connected to the microprocessing unit(s) 804 through input/output (I/O) device interface(s) 832 via the system bus 808, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

The architecture can be implemented as a system, comprising: means for receiving binary packages in a repository server, the binary packages in at least one of different formats or different languages; means for decompiling the binary packages into decompiled binary packages of content; means for filtering output of the decompiled binary packages to obtain semantically relevant content; means for generating a checksum for the semantically relevant content of each of the decompiled binary packages; means for storing the checksums in a plurality of servers; and means for refraining from download of a given decompiled binary package to a target server when a checksum for the given decompiled binary package is on the target server.

The architecture can be implemented as an alternative system, comprising: means for decompiling binary packages of a central repository into decompiled binary packages of content, the binary packages in at least one of same languages or different languages; means for filtering the content of the decompiled binary packages to obtain semantically relevant content; means for generating a list of checksums or hashes for the semantically relevant content of the decompiled binary packages; means for storing the list on a distributed system of target servers; and, means for preventing download of a given binary package to a given target server when a checksum or a hash of the given binary package is on the list stored on the given target server.

The architecture can be implemented as yet another alternative system, comprising: means for receiving binary packages in a repository server, the binary packages in at least one of different formats or different languages; means for decompiling the binary packages into decompiled binary packages that include content; means for filtering output of the decompiled binary packages to obtain semantically relevant content; means for generating checksums for the semantically relevant content of the decompiled binary packages; means for storing the checksums in a plurality of servers; and, means for refraining from download of a given binary package to a target server when a checksum for the given binary package is on the target server.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising a hardware processor and a memory device, the memory device storing computer-executable instructions that when executed by the hardware processor cause the hardware processor to perform operations comprising:
    selecting a decompiling tool from a set of decompiling tools and configuring the decompiling tool to decompile a given code assembly to obtain an associated decompiled output;
    filtering content of the decompiled output to extract semantically relevant content that determines a selected matching criteria, the matching criteria selected from the group consisting of:
    a match when two code assemblies contain the same publicly visible functions;
    a match when two code assemblies contain the same functions and members, either public or private or both; and
    a match when two code assemblies contain the same decompiled content;
    generating a value from the semantically relevant content of the code assembly; determining whether the value is on a value list associated with a server, the value in the value list representing a corresponding code assembly already downloaded to the server; and
    responsive to determining that the value is on the value list, refraining from downloading the code assembly to the server.

2. The system of claim 1, further comprising decompiling other code assemblies of same or different code languages into corresponding decompiled outputs.

3. The system of claim 2, wherein the decompiling generates language agnostic decompiled code assemblies.

4. The system of claim 2, further comprising creating a combined package of files of the semantically relevant content and a check sum list of corresponding checksums of the files.

5. The system of claim 4, further comprising downloading the checksum list of the files to the server and other servers of a distributed computing system.

6. The system of claim 1 wherein multiple matching criteria are selected.

7. A computer-implemented method comprising acts of:
    decompiling binary packages of a central repository into decompiled binary packages of content;
    obtaining a set of filters comprising:
    a filter that extracts from the decompiled binary packages semantically relevant content that determines equivalency when two or more binary packages contain the same externally visible functions;
    a filter that extracts from the decompiled binary packages semantically relevant content that determines equivalency when two or more binary packages contain the same public functions and members or private functions and members or both; and
    a filter that extracts from the decompiled binary packages semantically relevant content that determines equivalency when two or more binary packages contain the same decompiled output;
    selecting a filter from the set of filters to meet a degree of equivalency for content;
    filtering the content of the decom piled binary packages using the selected filter to obtain a semantically relevant content at the degree of equivalency;
    generating a list of check sums or has hashes for the semantically relevant content of the decompiled binary packages; and
    storing the list on a distributed system of target servers.

8. The method of claim 7, further comprising, on the central repository, selecting a specific decompiling tool fora given binary package to generate an associated decompiled binary package, the decompiling tool based on a source language of the binary package.

9. The method of claim 7, further comprising performing the acts of decompiling, filtering, generating, and storing via the central repository.

10. The method of claim 7, wherein selecting the filter comprises selecting a configurable set of filters.

11. The method of claim 7, wherein the set further comprises a filter that extracts semantically relevant content that determines equivalency when the check sums or hashes of associated public function signatures of two or more binary packages match.

12. The method of claim 7, wherein the set further comprises:

a filter that filters binary packages that are the same;

a filter that filters binary packages generated from a same source;

a filter that filters binary packages that use names a automatically generated variables;

a filter that filters memory addresses generated by compilers;

a filter that filters types and methods implemented by a given binary package without considering the content or implementations of that given binary package; or a filter that filters only publicly-accessible types and methods while ignoring private implementation details.

13. The method of claim 12 multiple filters are selected from the set.

14. The system of claim 7 wherein multiple filters are selected from the set.

15. A computer-implemented method comprising acts of:

receiving, at a repository server, a plurality of binary packages;

decompiling the binary packages into decompiled binary packages that include content;

selecting a filter that determines a degree of equivalency between two decompiled binary packages;

filtering the decompiled binary packages using the filter to obtain content semantically relevant to the degree of equivalency;

generating checksums for the semantically relevant content of the decompiled binary packages, the checksums identifying whether two or more decompiled binary packages meet the degree of equivalency;

storing the check sums in a plurality of servers.

16. The method of claim 15, wherein the decompiling decompiles the binary packages into a common intermediate language independent of a source code language used to create the binary packages.

17. The method of claim 15, further comprising selecting a specific decompiling tool for a given binary package based on a source language of the binary package to generate the associated decompiled binary package.

18. The method of claim 15, further comprising, after loading a binary package having a given checksum into a target server, checking a checksum list of the checksums on the target server to determine whether to download an equivalent binary package to the target server.

19. The method of claim 15, wherein the filter determines two or more binary packages to be equivalent when the corresponding checksums of associated public function signatures match.

\* \* \* \* \*